United States Patent [19]
Takahashi et al.

[11] Patent Number: 6,092,480
[45] Date of Patent: Jul. 25, 2000

[54] GENERATION OF BUBBLES FOR FRICTION-REDUCING SHIP AND METHOD FOR REDUCING SKIN-FRICTION

[75] Inventors: Yoshiaki Takahashi, Tokyo; Yuki Yoshida, Kawasaki; Hiroharu Kato, 5-31-9, Koganehara, Matsudo-shi, Chiba-ken, all of Japan

[73] Assignees: Ishikawajima-Harima Heavy Industries Co., Ltd., Tokyo; Hiroharu Kato, Chiba-Ken, both of Japan

[21] Appl. No.: 09/110,558

[22] Filed: Jul. 6, 1998

[30] Foreign Application Priority Data

Aug. 1, 1997 [JP] Japan ................................. 9-208097
Nov. 20, 1997 [JP] Japan ................................. 9-320059

[51] Int. Cl.$^7$ ....................................................... B63B 1/34
[52] U.S. Cl. ............................................................ 114/67 A
[58] Field of Search ............................. 114/67 R, 67 A, 114/222

[56] References Cited

U.S. PATENT DOCUMENTS

5,575,232 11/1996 Kato et al. ............................ 114/67 A
5,803,410 9/1998 Hwang .................................. 114/67 A

*Primary Examiner*—Stephen Avila
*Attorney, Agent, or Firm*—Pearne & Gordon LLP

[57] ABSTRACT

A method is provided for reducing skin-friction of a ship moving through bubbly flow fields generated in proximity of hull surfaces by jetting gas through a plurality of jet nozzles provided on hull surfaces of the ship. The gas flow rate is controlled so as to establish a peak void fraction in a turbulent boundary layer, by applying an observation that the location of a peak void fraction shifts away in a direction normal to the hull surface with increasing gas flow rate through the jet nozzles.

27 Claims, 7 Drawing Sheets

GENERATION OF BUBBLES FOR FRICTION-REDUCING SHIP AND METHOD FOR REDUCING SKIN-FRICTION

BACKGROUND OF THE INVENTION

1. Field of the Invention

The present invention relates in general to generating bubbles for friction-reducing ships and lowering of skin-friction, and relates in particular to a technique of jetting micro-bubbles from a ship to reduce skin-friction.

2. Description of the Related Art

Technologies for reducing skin-friction effects of ships are disclosed in Japanese Patent Applications represented by First Publication numbers: S50-83992; S53-136289; S60-139586; S61-71290; as well as in Japanese Practical Utility Models, S61-39691; and S61-128185. These friction-reducing ships produce lower skin-friction at cruising speeds by the action of numerous bubbles intervening at the interface between water and hull, produced by jetting gases such as air from the hull surface into the water.

To increase the friction reduction effects at the hull interface using such bubble jet techniques, it is known that, in a turbulent boundary layer formed near the hull surfaces, a constant $\eta_m$ in the following expression (1) must be made large:

$$\eta_m = \lambda_m / d_b \cdot \alpha_m^{2/3} \tag{1}$$

where $\alpha_m$ is an average void fraction in a turbulent boundary layer; $d_b$ is a diameter of micro-bubbles; and $\lambda_m$ is a constant related to the size of a ship.

Although it may be thought that the volume of gas blowing into the water should be made higher to increase the average void fraction $\alpha_m$, but it is found that higher gas flow rates cause micro-bubbles to be pushed out of the turbulent boundary layer, resulting in no increase in the average void fraction $\alpha_m$. Also, there has not been an effective measure for gauging the magnitude of average void fraction $\alpha_m$.

In the current technologies cited above, micro-bubbles are produced by jetting compressed air from compressor through a plurality of holes or porous plate. However, it has been known that the diameter of micro-bubbles produced by jetting air are governed by the bubbly flow speed (approximately equal to the ship speed), it is impractical to restrict the ship speed to suit the bubble size, and it would be ideal to control jetting parameters to optimize the bubble size for any speed of the ship.

SUMMARY OF THE INVENTION

It is an object of the present invention to provide a method for reducing skin-friction of a ship moving through bubbly flow fields efficiently by controlling the flow rate of gas jetting from the hull surfaces into water.

It is another object of the present invention to enable micro-bubbles of a desired range of diameter to be generated without being restrained by the ship speed so that skin-friction can be reduced at any ship speed.

The first object has been achieved in a method for reducing skin-friction of a ship moving through bubbly flow fields generated in proximity of hull surfaces by jetting gas from a plurality of jet nozzles provided on hull surfaces of the ship, and by controlling gas flow rates through jet nozzles so as to establish a peak void fraction within a turbulent boundary layer, according to a theoretical observation that a location of the peak void fraction shifts away in a direction normal to the hull surfaces with increasing gas flow rates through the jet nozzles.

A skin-friction-reducing arrangement for a ship to reduce skin-friction, while moving through bubbly flow fields created by jetting gas from jet nozzles into water in proximity of hull surfaces of the ship, is comprised by: a plurality of jet nozzles provided on hull surfaces for jetting gas into water; and a gas supply facility for controlling gas flow rates to jet nozzles so as to establish a peak void fraction within a turbulent boundary layer.

The present inventors carried out theoretical studies of how the skin-friction reduction effects are related to ship speed through bubbly flow fields near the hull surfaces and the gas supply rate to jet nozzles, and presented the results in a Japanese Patent Application, H9-142818, First Publication. Resulting from this study are the following observations. When the gas flow rate $Q_G$ through all the jet nozzles are the same, slow flow speeds $U_m$ result in higher void fraction $\alpha_m$ and less friction, represented by smaller friction reduction ratios $C_f/C_{f0}$ (ratio of a fictional coefficient with bubble $C_f$ to a frictional coefficient without bubble $C_{f0}$). When the flow speed $U_m$ is kept constant, higher gas flow rate $Q_G$ result in smaller friction reduction ratio $C_f/C_{f0}$ indicating that the friction is reduced.

Figure 1:
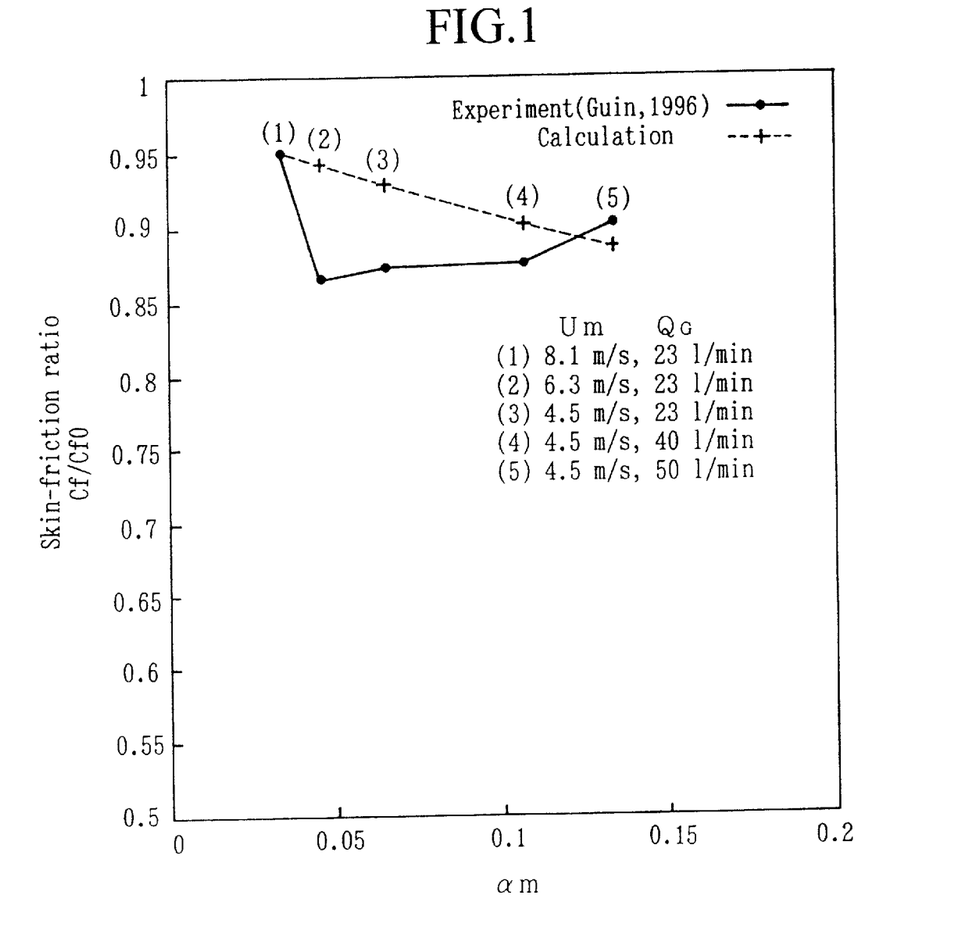
FIG. 1 is a graph of skin-friction ratio and void fraction in a first embodiment.
Figure 2:
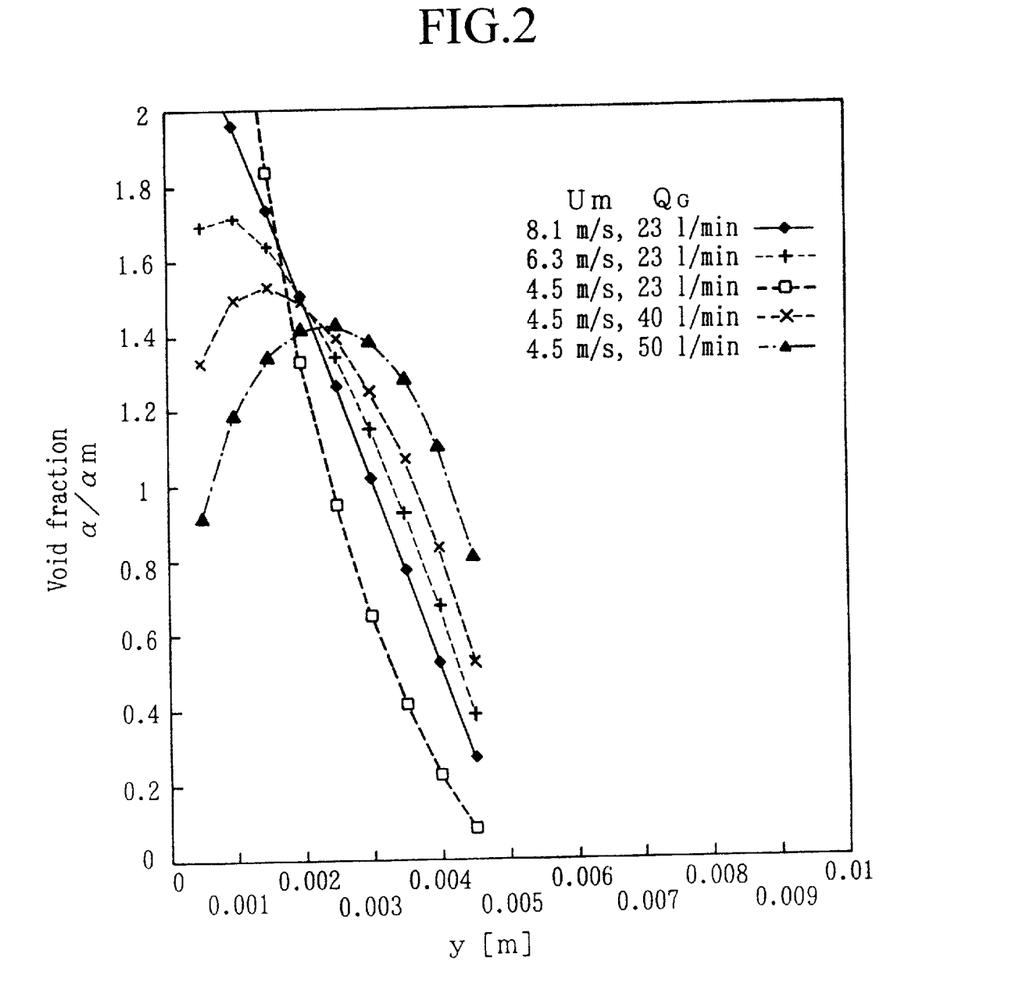
FIG. 2 is a graph of void fraction and y in a second embodiment.

However, as shown in FIG. 2, it was also found that the location of peak void fraction moved away from the hull surfaces. Therefore, it is clear that the method of the present invention has been derived from our theoretical analyses and that the method is also consistent with a known view that the coefficient $\eta m$ in the turbulent boundary region must be made high to produce effective skin-friction reduction effects.

In addition to the approach disclosed above, a method is provided for generating bubbles for reducing skin-friction of a ship while moving through bubbly flow fields created by jetting bubbles into water from jet nozzles provided on hull surfaces, wherein a radius of the bubbles is given by an expression (2):

$$R = 2.4 \cdot \{Q/(U \cdot k)\}^{1/2} \tag{2}$$

where Q is a gas flow rate; and U is a flow velocity in the bubbly flow field, and k is a number of active jet nozzles.

Also, the present invention provides an arrangement of jet nozzles to reduce skin-friction of a ship while moving through bubbly flow fields created by jetting bubbles from jet nozzles into water to generate bubbly flow fields in an interface between the ship and water, comprising: a plurality of jet nozzles arranged in n lines along flow lines of bubbly flow fields; and a gas supply facility for supplying compressed gas to a selected number of active nozzles k so as to produce bubbles within a range of radii.

The present invention further relates to a friction-reducing ship having an arrangement provided on the ship to reduce skin-friction of a ship while moving through bubbly flow fields, comprised by: a plurality of jet nozzles arranged in n lines along flow lines of bubbly flow fields; and a gas supply facility for supplying compressed gas to a selected number of active nozzles k so as to produce bubbles within a range of radii.

It is known that the radius of micro-bubbles, generated by jetting gas from the jet nozzles into water and formed at an interface between the ship and water, is given by an expression (3):

$$R = a \cdot (Q/U)^{1/2} \qquad (3)$$

where, Q is a gas flow rate through a nozzle into the water; and U is a flow speed in the bubbly flow field comprised by micro-bubbles of radius R. The constant a can be obtained by experimentation.

Figure 5:
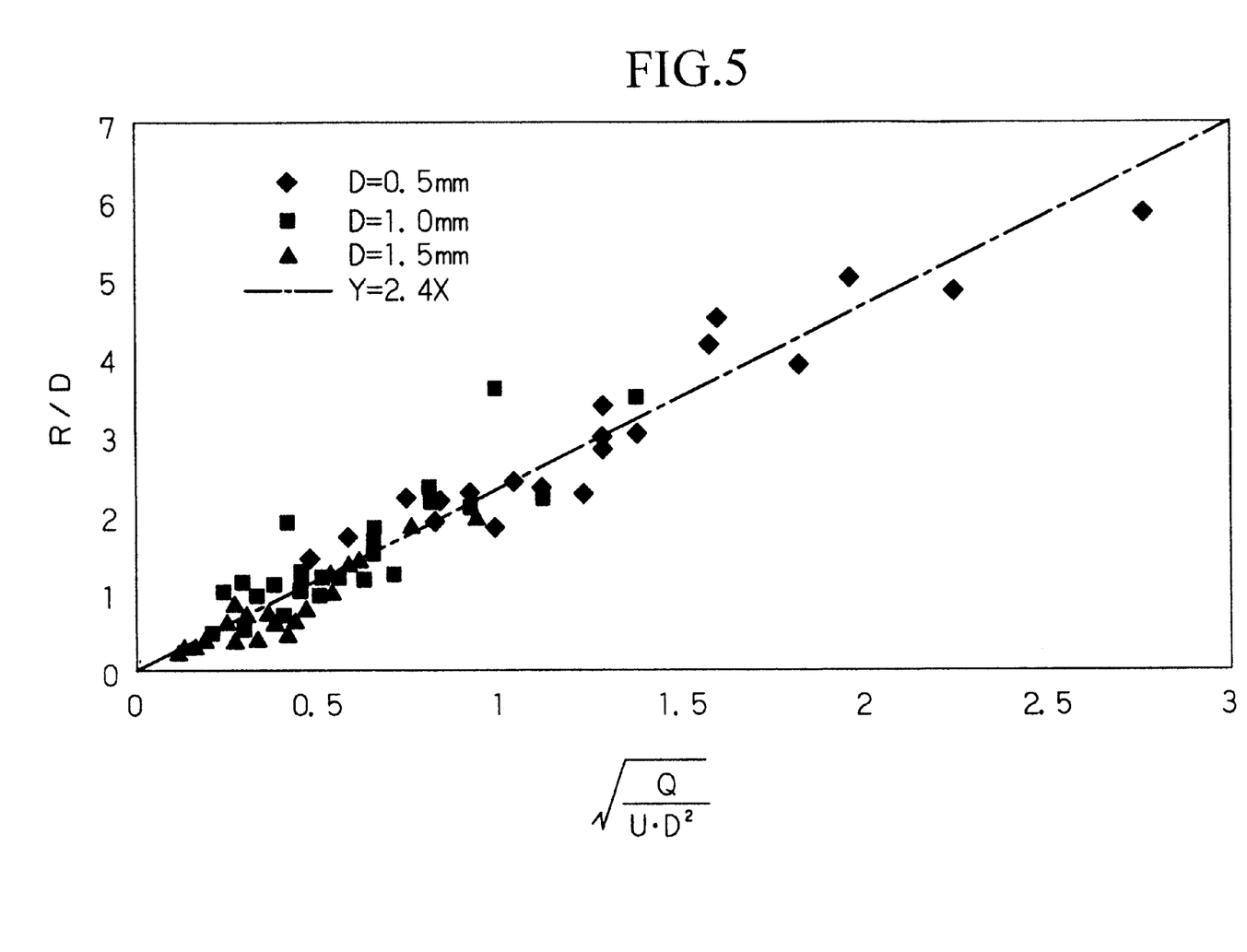
FIG. 5 is a graph for explaining the basic principle of the first embodiment.

In a series of experiments related to the present invention, the results shown in FIG. 5 were obtained in water tank experiments which produced a value of 2.4 for the constant a. In FIG. 5, R in expression (3) has been normalized by diameters D of the various jet nozzles used in the experiments.

A modified arrangement of skin-friction reduction method is based on supplying a given volume gas through a selected number of active nozzles k. Then, the flow rate Q may be varied from Q at (k=1) to Q/n at (k=n) by varying the number k of active jet nozzles from 1 to n. Expression (2) above is a specific case of the general expression (3) for localized bubbly flow fields. Under a given set of flow rate Q and flow speed U, the radius of micro-bubbles may be controlled by altering the active nozzles number k in expression (2).

DESCRIPTION OF THE PREFERRED EMBODIMENTS

In the following, preferred embodiments will be presented with reference to the drawings.

First Embodiment

Figure 3:
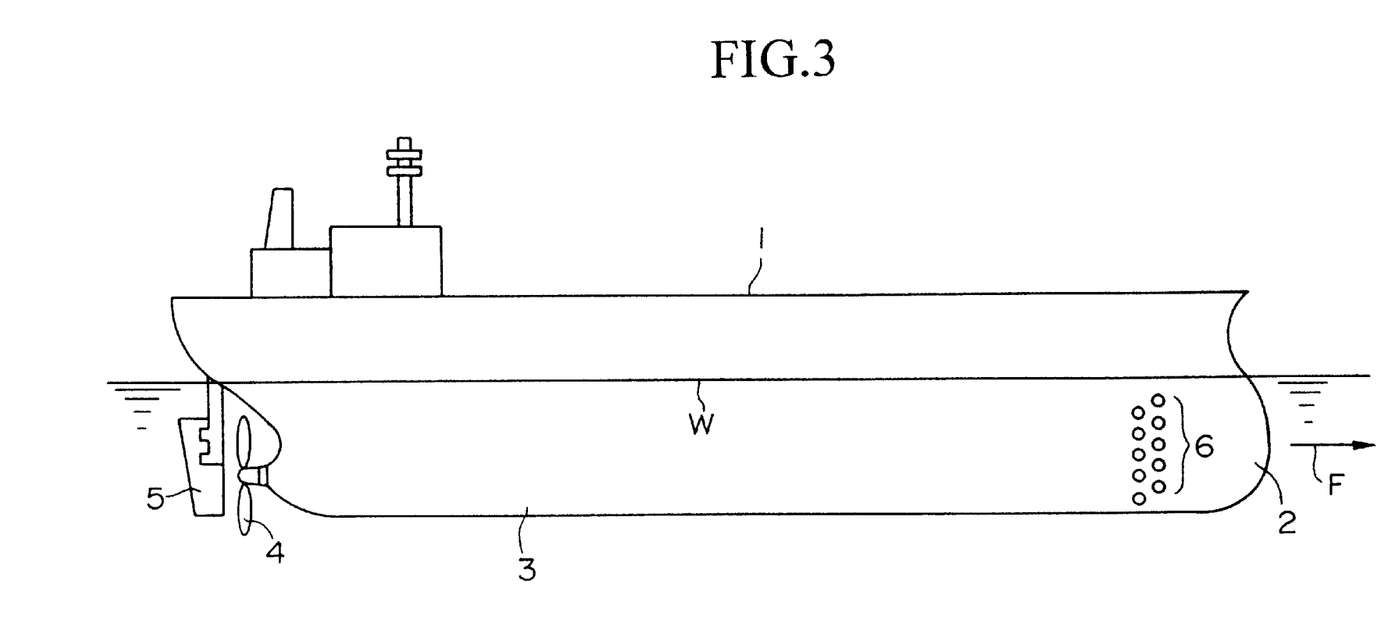
FIG. 3 is an exterior view of a friction-reducing ship in the first embodiment.

FIG. 3 shows a ship 1, the bow 2, submerged surface 3, a screw 4, a rudder 5, jet nozzles 6, the cruising direction F, and the waterline W. On both port side and starboard side near the bow of the ship 1 of the submerged surfaces 3, numerous jet nozzles 6 are provided, and although the drawing only shows the starboard side, such nozzles 6 are provided also on the port side. Similar nozzles 6 may also be provided on the bottom surface near the bow 2 of the ship 1.

Figure 4:
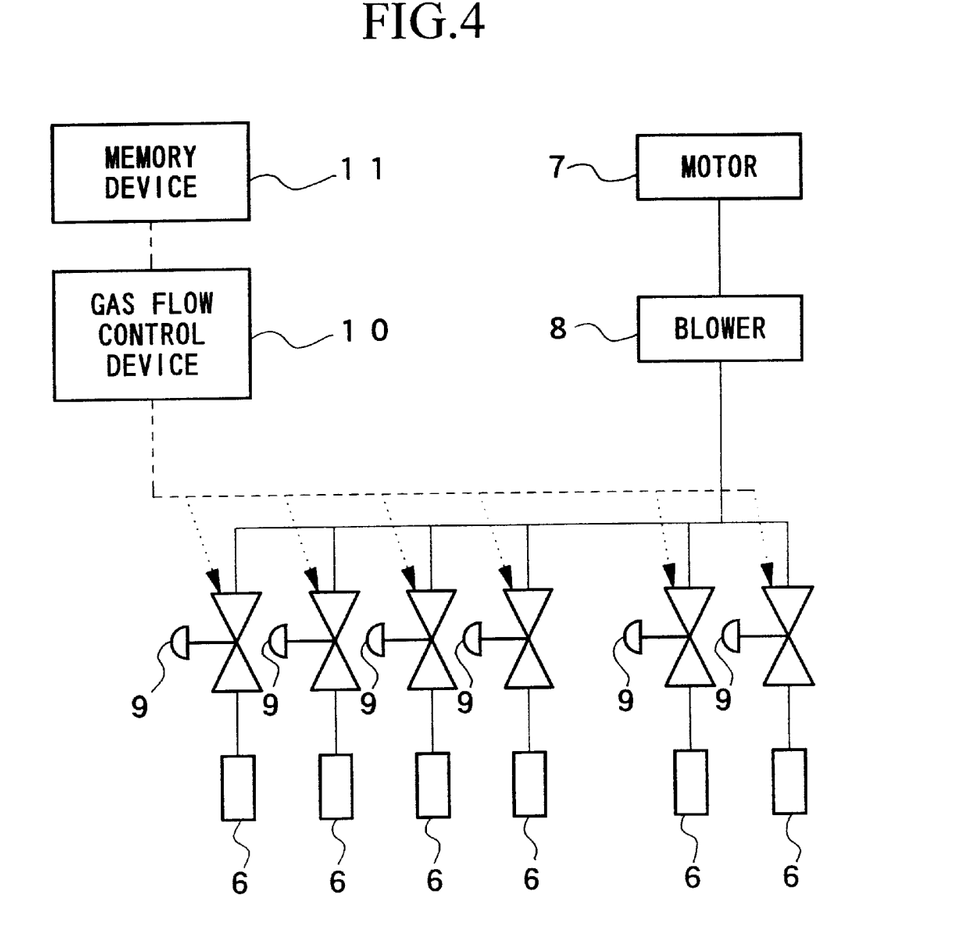
FIG. 4 is a schematic block diagram of a control system for gas flow rates to produce bubble jet in the first embodiment.

FIG. 4 shows a block diagram of a gas flow control system comprised by: a motor 7, a blower 8, control valves 9, a gas flow control device 10, and a memory device 11. Each jet opening 6 is piped to the blower 8 through its own control value 9. The blower 8 is operated by the motor 7, and compressed air is supplied through individual control valves 9. Each control valve 9 is controlled independently by the gas flow control device 10 to regulate the opening of the control valve 9.

Gas flow control device 10 includes, among others, an interface circuit to drive the individual control valves 9 and microprocessors to control the interface circuit according to control programs. The memory device 11 stores control programs and flow rate control data which are necessary for executing the control programs.

Flow rate control data include, for example, void fraction distribution data in proximity of the hull surfaces, obtained by computer simulation studies. In other words, the data correlate computed void fraction distribution patterns with the distance (at right angles) to turbulent boundary layers from the various regions of the submerged surface 3.

In this embodiment, control parameters chosen are water speed and gas flow rates to the jet nozzles 6 at the various submerged locations, and the mathematical expressions, relating the void fractions to the distance to turbulent boundary layers for various ranges of these parameters, are stored in the memory device 11. Details of such simulation studies are disclosed in Japanese Patent Application, First Publications H8-144646 and H9-292999, for example.

The operation of the gas flow control device 10 will be explained.

When the ship reaches a cruising speed, for example, the gas flow control device 10 is activated, and jetting of gas bubbles from the jet nozzles 6 is started. When the gas flow control device 10 receives a signal from the speed control device (not shown) that the ship has reached a cruising speed range, it begins a process of controlling individual control valves 9 according to the control program.

After receiving the speed data of the friction-reducing ship as a control parameter from the ship speed control device, the gas flow control device 10 computes the values of the turbulent boundary layer thickness at the bubbly flow velocities for various locations of the submerged surface 3, on the basis of the reported cruising speed and stored shape data for the ship. The gas flow control device 10 then derives a required value of gas flow rate for each of the various locations so that the peak void fraction will occur within the respective boundary layer of the various locations of the submerged surface 3 by entering the values of the thickness of the turbulent boundary layers and the bubbly flow velocities into the gas flow control data.

Here, because of differences in the shape of the ship, the bubbly flow velocities at the various locations of the submerged surface 3 will be different even though the cruising speeds in the various locations may be the same. In this embodiment, thickness values of the turbulent boundary layers at various locations of the submerged surface 3 are calculated by taking this effect into account, and the gas flow rates to various jet nozzles 6 are adjusted according to such results of computations. For example, if the turbulent boundary layer thickness is different at a waterline W region compared with that at the bottom surface region, gas flow rates to the jet nozzles 6 in the vicinity of the waterline region and the bottom surface region are adjusted independently of the other, so that the peak void fraction distribution will be located within the respective turbulent boundary layer at these locations.

Accordingly, by controlling the gas flow rates to individual jet nozzles 6, it is possible to effectively reduce skin-friction by adjusting local friction ratios at various locations of the submerged surface 3 while conserving energy by minimizing the gas flow rate required to be jetted into the water.

In the above embodiment, the bubbly flow velocities at various locations of the submerged surface 3 were obtained from the moving speed of the ship, and the gas flow rates to jet nozzles 6 were adjusted independently, however, it may be simpler to control gas flow rates to the jet nozzles 6 uniformly according to the moving speed, if the thickness of the turbulent boundary layer can be regarded to be not significantly different in the various locations of the submerged surface 3.

Also, in the above embodiment, gas flow control data were programmed into the memory device 11, but instead of the memory device 11, an arrangement may be considered in which bubble measuring devices are provided in the rear of the jet nozzles 6 on the submerged surface 3. In this setup, void fraction distributions in the direction normal to the submerged surface 3 are computed by the gas flow control device 10, on the basis of the volume of the bubbles detected by the bubble measuring device, and the gas flow rates to jet nozzles 6 are adjusted according to such results. In this case, bubble measuring devices may be positioned on both starboard and port sides as well as on the bottom surface. Also, such a bubble measuring device may be based on laser scanning of the bubbly water, and the reflection data may be used to determine the number of bubbles in a given volume.

The first embodiment features are summarized below.
(1) The method offers an efficient skin-friction reduction action while conserving the overall gas volume needed to be supplied to the jet nozzles, because the gas flow rates to each nozzle are adjusted so as to establish the peak void fraction within the respective turbulent boundary layers of the corresponding jet nozzles, by applying our observation that the location of the turbulent boundary layer is shifted in the direction normal to the hull as the gas flow rate increases.
(2) The friction-reducing action is optimized with respect to the various locations of the submerged surfaces, because the gas flow rates are adjusted individually to each jet nozzles so that the peak void fraction will occur within the turbulent boundary layers in proximity of the corresponding jet nozzles.
(3) Ship manufacturing cost is reduced because the embodied method relies on predetermined results of computer simulation of void fraction distribution in proximity of the hull so that adjustments to gas flow rates to each jet nozzles can be made without the necessity of having measuring devices to determine the void fraction distribution patterns in real-time.
(4) When bubble measuring devices are provided on the hull, the void fraction distribution in proximity of the hull can be computed and gas flow rates to jet nozzles are adjusted according to real-time results, therefore, even more accurate control over the skin-friction reduction effects can be achieved based on the actual void fraction distribution about the cruising ship.

Second Embodiment

A second embodiment will be presented with reference to the drawings. The parts which are the same as those in the first embodiment are referred to by the same reference numerals, and their explanations are omitted.

Figure 6:
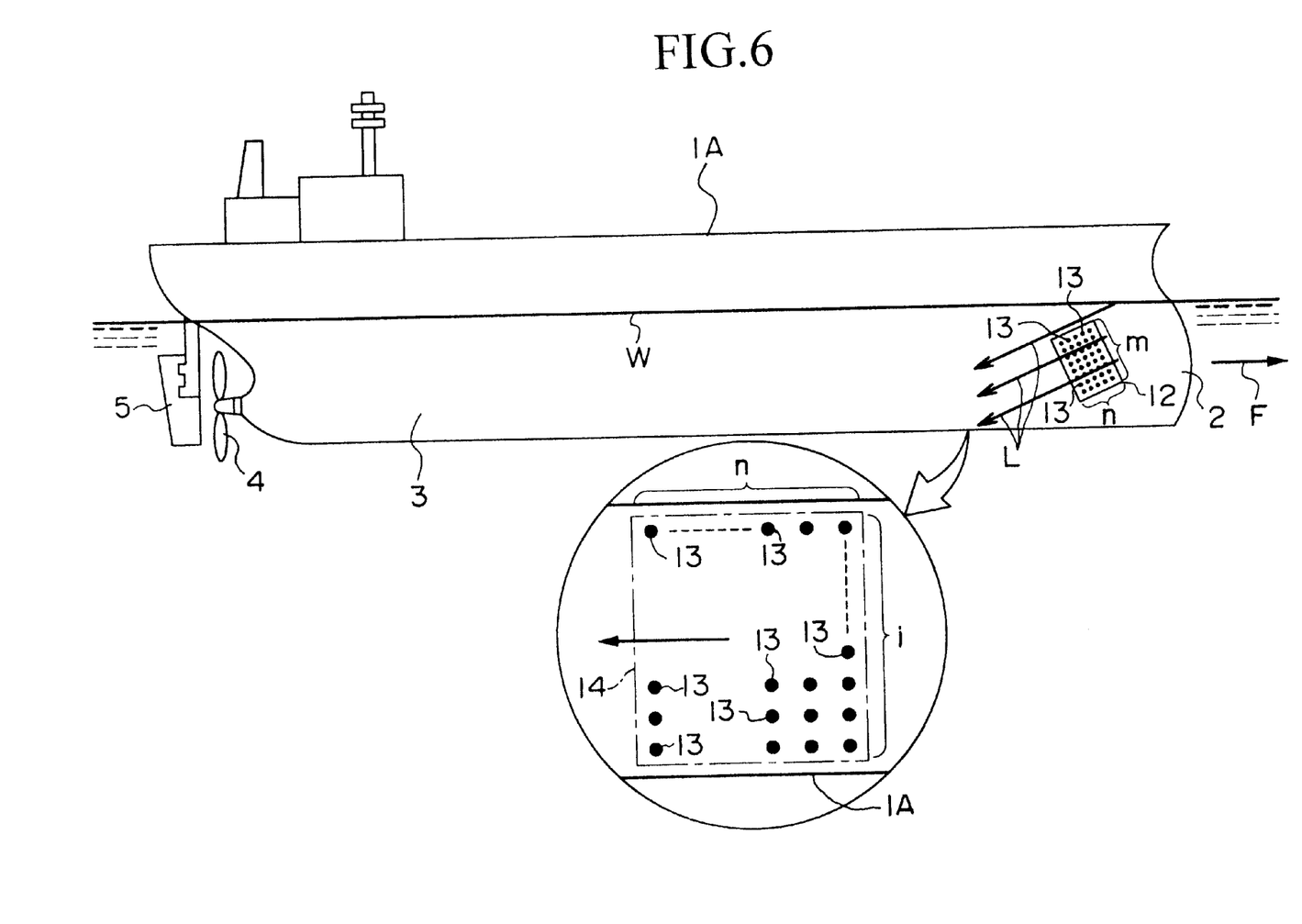
FIG. 6 is an exterior view of a friction-reducing ship in the second embodiment.

FIG. 6 shows a ship 1A; the bow 2, the submerged surface 3; a screw 4; a rudder 5; the moving direction F; flow lines L; and the waterline W. On the submerged surface 3 near the bow 2, an array (m·n) of jet nozzles 13, constituted by n lines of nozzles arranged along the flow lines L and m columns of nozzles at right angles to the flow lines L, are disposed on both the port and starboard sides of the ship 1A. Although the drawing shows only the starboard side of the ship 1A, a similar m·n array of jet nozzles 13 are provided on the port side of the submerged surface 3. A similar (i·n) array of jet nozzles, constituted by n lines along the flow lines L and i columns at right angle to the flow lines L, are provided on the bottom section 14 of the ship 1A near the bow 2.

Figure 7:
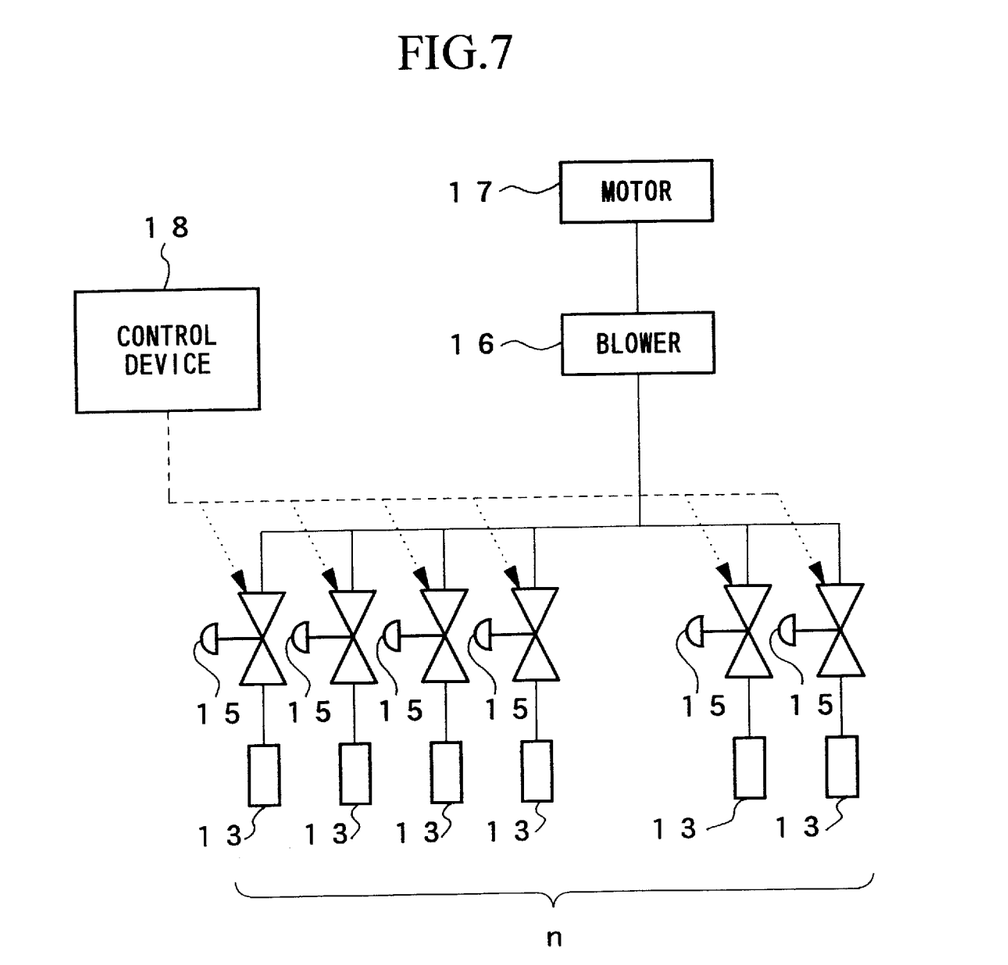
FIG. 7 is a schematic block diagram of a control system for gas supply to produce gas jet in the second embodiment.

As shown in FIG. 7, each jet nozzles 13 arranged along the n lines is connected by pipe to the blower 16 through its own control valve 15. The blower 16 is driven by a motor 17 and supplies compressed air to individual nozzles 13 through respective control valve 15. A control device 18 controls the opening of the control valve 15.

In this arrangement of the friction-reducing ship, compressed air is supplied to a selected number of active nozzles, k, among all the jet nozzles 13 in the array. The number of active jet nozzles, k, may be comprised by one nozzle 13 or by a plurality of adjacent nozzles 13.

The radius R of the micro-bubbles produced in this arrangement of the nozzles 13 are controlled according to the following expression (2):

$$R=2.4 \cdot \{Q/(U \cdot k)\}^{1/2} \quad (2)$$

where a variable k (an integer) indicates the selected number of active nozzles supplied with compressed air; Q is a gas flow rate; and U is a flow velocity in the bubbly flow field. The radius R of the micro-bubbles produced in the boundary layer between the ship and the water is controlled by the control device 18 selecting a value for the parameter k, the number of active jet nozzles. Therefore, the friction reduction effects can be achieved without being restrained by the ship speed so that optimum bubbly flow fields can be produced at any speeds slower than the cruising speed of the ship. This is a particular important consideration because skin-friction may exert an adverse drag effect on the ship at slower speeds.

In the above embodiment, the nozzle arrays were provided on the bottom surface and the side surfaces of the ship 1A, however, the nozzle array may be provided only on the bottom surface or on the side surfaces. In such a case, although the friction reduction effects are not as high, the cost of manufacturing can be lowered.

The second embodiment thus enables to produce micro-bubbles of certain radius R by blowing gas into the water through a plurality of jet nozzles 13 provided on the hull of the ship 1A, by adjusting the parameter k of active jet nozzles for a given gas flow rate Q and a flow speed U according to expression (2), without being restrained by the ship speed.

What is claimed is:

1. A method for reducing skin-friction of a ship moving through bubbly flow fields generated in proximity of hull surfaces by jetting gas from a plurality of jet nozzles provided on hull surfaces of said ship, and by controlling gas flow rates through jet nozzles so as to establish a peak void fraction within a turbulent boundary layer, according to a theoretical observation that a location of said peak void fraction shifts away in a direction normal to said hull surfaces with increasing gas flow rates through said jet nozzles.

2. A method according to claim 1, wherein void fraction distribution patterns are predetermined from computer simulations, and a gas flow rate to each jet nozzle is controlled according to computed results.

3. A method according to claim 1, wherein a bubble measuring device is provided for computing number of bubbles in proximity of said hull surfaces to compute void fractions in said proximity, and a gas flow rate to each jet nozzle is controlled according to computed results.

4. A method for reducing skin-friction of a ship moving through bubbly flow fields generated in proximity of hull surfaces by jetting gas from a plurality of jet nozzles provided on hull surfaces of said ship, and by controlling independently gas flow rates through said jet nozzles so as to establish a peak void fraction within a turbulent boundary layer, according to a theoretical observation that a location of said peak void fraction shifts away in a direction normal to said hull surfaces with increasing gas flow rates through said jet nozzles.

5. A method according to claim 4, wherein void fraction distribution patterns are predetermined from computer simulations, and a gas flow rate to each jet nozzle is controlled according to computed results.

6. A method according to claim 4, wherein a bubble measuring device is provided for computing the number of bubbles in proximity of said hull surfaces to compute void fractions in the proximity of the hull surfaces, and a gas flow rate to each jet nozzle is controlled according to computed results.

7. A ship having skin-friction-reducing arrangements to reduce skin-friction while moving through bubbly flow fields created by jetting gas from jet nozzles into water in proximity of hull surfaces of said ship, comprising:
    a plurality of jet nozzles provided on hull surfaces for jetting gas into water;
    a gas supply facility for controlling independently gas flow rates to jet nozzles so as to establish a peak void fraction within a turbulent boundary layers according to a theoretical observation that a location of said peak void fraction shifts away in a direction normal to said hull surfaces with increasing gas flow rates through said jet nozzles.

8. A ship having skin-friction-reducing arrangements to reduce skin-friction while moving through bubbly flow fields created by jetting bubbles from jet nozzles into water in proximity of hull surfaces of said ship, comprising:
    a plurality of jet nozzles provided on hull surfaces for jetting gas into water;
    a gas supply facility for controlling independently gas flow rates to jet nozzles so as to establish a peak void fraction within a turbulent boundary layer.

9. A ship according to claim 8, wherein a gas supply facility adjusts a gas flow rate to each jet nozzle according to void fraction distribution patterns, in a proximity of different locations of submerged surfaces along said ship, which are predetermined by computation.

10. A ship according to claim 8, wherein a bubble measuring device is provided to determine bubble volumes in proximity of said hull surfaces to compute void fractions in different locations of submerged surfaces of said ship, and a gas flow rate to each jet nozzle is controlled according to computed results.

11. A ship having skin-friction-reducing arrangements to reduce skin-friction while moving through bubbly flow fields created by jetting gas from jet nozzles into water in proximity of hull surfaces of said ship, comprising:
    a plurality of jet nozzles provided on hull surfaces for jetting gas into water;
    a gas supply facility for controlling independently gas flow rates to jet nozzles so as to establish a peak void fraction within a turbulent boundary layer, according to a theoretical observation that a location of said peak void fraction shifts away in a direction normal to said hull surfaces with increasing gas flow rates through said jet nozzles;
    wherein said gas supply facility adjusts a gas flow rate to each jet nozzle according to void fraction distribution patterns, in a proximity of different locations of submerged surfaces along said ship, which are predetermined by computation.

12. A ship having skin-friction-reducing arrangements to reduce skin-friction while moving through bubbly flow fields created by jetting gas from jet nozzles into water in proximity of hull surfaces of said ship, comprising;
    a plurality of jet nozzles provided on hull surfaces for jetting gas into water;
    a gas supply facility for controlling independently gas flow rates to jet nozzles so as to establish a peak void fraction within a turbulent boundary layer, according to a theoretical observation that a location of said peak void fraction shifts away in a direction normal to said hull surfaces with increasing gas flow rates through said jet nozzles;
    wherein a bubble measuring device is provided to determine bubble volumes in proximity of said hull surfaces to compute void fractions in different locations of submerged surfaces of said ship, and a gas flow rate to each jet nozzle is controlled according to computed results.

13. A method for generating bubbles for reducing skin-friction of a ship while moving through bubbly flow fields created by jetting gas into water from jet nozzles provided on hull surfaces, by arranging a plurality of jet nozzles in n lines along flow lines of bubbly flow fields, and by supplying compressed gas to a selected number k of active nozzles so as to determine a radius of said bubbles according to the expression:

$$R = 2.4 \cdot \{Q/(U \cdot k)\}^{1/2}$$

where Q is a gas flow rate; and U is a flow velocity in the bubbly flow field, and k is a number of active jet nozzles.

14. A ship having skin-friction-reducing arrangements to reduce skin-friction while moving through bubbly flow fields created by jetting gas from jet nozzles into water to generate bubbly flow fields in an interface between said ship and water, comprising:

a plurality of jet nozzles arranged in n lines along flow lines of bubbly flow fields; and a gas supply facility for supplying compressed gas to a selected number k of active nozzles so as to produce bubbles having radii within a range of values.

15. A ship according to claim 14, wherein jet nozzles are provided in proximity of a bow of said ship.

16. A ship according to claim 14, wherein jet nozzles are provided in proximity of a bow on a starboard side and on a port side of said ship.

17. A ship having skin-friction-reducing arrangements to reduce skin-friction while moving through bubbly flow fields created by jetting bubbles from jet nozzles into water to generate bubbly flow fields in an interface between said ship and water, comprising:

a plurality of jet nozzles arranged in n lines along flow lines of bubbly flow fields; and a gas supply facility for supplying compressed gas to a selected number k of active jet nozzles determined according to an expression:

$$R = 2.4 \cdot \{Q/(U \cdot k)\}^{1/2}$$

where Q is a gas flow rate; and U is a flow velocity in a bubbly flow field, so as to produce bubbles having radii within a range of values.

18. A ship according to claim 17, wherein jet nozzles are provided in proximity of a bow of said ship.

19. A ship according to claim 17, wherein jet nozzles are provided in proximity of a bow on a starboard side and on a port side of said ship.

20. A method for reducing skin-friction for a ship by jetting gas into water to generate bubbly flows in an interface between said ship and water by arranging a plurality of jet nozzles in n lines along flow lines of bubbly flow fields, and by supplying compressed gas to a selected number k of active nozzles so as to produce bubbles having radii within a range of values.

21. A method according to claim 20, wherein jet nozzles are provided in proximity of a bow on a bottom surface of said ship.

22. A method according to claim 20, wherein jet nozzles are provided in proximity of a bow on a starboard side and on a port side of said ship.

23. A method according to claim 20, wherein jet nozzles are provided in proximity of a bow on a starboard side and on a port side as well as on a bottom surface of said ship.

24. A method for reducing skin-friction for a ship by jetting bubbles into water to generate bubbly flows in an interface between said ship and water by arranging a plurality of jet nozzles in n lines along flow lines of bubbly flow fields, and by supplying compressed gas to a selected number k of active nozzles determined according to an expression:

$$R = 2.4 \cdot \{Q/(U \cdot k)\}^{1/2}$$

where Q is a gas flow rate; and U is a flow velocity in a bubbly flow field, so as to produce bubbles having radii within a range of values.

25. A method according to claim 24, wherein jet nozzles are provided in proximity of a bow on a bottom surface of said ship.

26. A method according to claim 24, wherein jet nozzles are provided in proximity of a bow on a starboard side and on a port side of said ship.

27. A method according to claim 24, wherein jet nozzles are provided in proximity of a bow on a starboard side and on a port side as well as on a bottom surface of said ship.

* * * * *